United States Patent
Kitada

(10) Patent No.: US 10,444,893 B2
(45) Date of Patent: Oct. 15, 2019

(54) TOUCH INPUT DEVICE AND TOUCH INPUT DETECTING METHOD

(71) Applicant: Murata Manufacturing Co., Ltd., Nagaokakyo-shi, Kyoto-fu (JP)

(72) Inventor: Hiroaki Kitada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 70 days.

(21) Appl. No.: 15/451,924

(22) Filed: Mar. 7, 2017

(65) Prior Publication Data

US 2017/0177156 A1    Jun. 22, 2017

Related U.S. Application Data

(63) Continuation of application No. PCT/JP2015/077657, filed on Sep. 30, 2015.

(30) Foreign Application Priority Data

Oct. 7, 2014   (JP) .................................. 2014-206242

(51) Int. Cl.
  *G06F 3/041*   (2006.01)
  *G06F 3/044*   (2006.01)
(52) U.S. Cl.
  CPC ............ *G06F 3/0416* (2013.01); *G06F 3/044* (2013.01); *G06F 2203/04105* (2013.01)
(58) Field of Classification Search
  CPC . G01L 1/168; G01L 1/18; G06F 3/044; G06F 3/0414; G06F 3/0416
  See application file for complete search history.

(56) References Cited

U.S. PATENT DOCUMENTS 9,417,725 B1   8/2016   Watazu et al.
9,507,511 B2   11/2016  Ikeda
(Continued)

FOREIGN PATENT DOCUMENTS

JP   H05-61593 A    3/1993
JP   2006-106842 A  4/2006
(Continued)

OTHER PUBLICATIONS

International Search Report issued in International Application No. PCT/JP2015/077657, dated Dec. 22, 2015.
(Continued)

*Primary Examiner* — Sepehr Azari
(74) *Attorney, Agent, or Firm* — Arent Fox LLP

(57) ABSTRACT

A touch input device includes a position detecting sensor which detects a touch position on an operation surface. A press detecting sensor detects a press on the operation surface. A position detecting sensor alternatively and repeatedly applies and stops applying a drive signal to the position detecting sensor. The position detecting sensor detects a position detection signal output from the position detecting sensor and discharges a charge of the position detecting sensor during the period in which the drive signal is not applied to the position detecting sensor. A press signal detector detects a press detection signal outputted from the press detecting sensor during a period during which the drive signal is not applied to the position detecting sensor. Consequently, it is possible to detect a pressing amount without being influenced by touch position detection processing.

12 Claims, 4 Drawing Sheets

(56) References Cited

U.S. PATENT DOCUMENTS

| | | |
|---|---|---|
| 9,575,608 B2 | 2/2017 | Ando et al. |
| 2008/0309627 A1* | 12/2008 | Hotelling .......... G02F 1/134363 345/173 |
| 2011/0054837 A1 | 3/2011 | Ikeda |
| 2014/0152618 A1* | 6/2014 | Ando ...................... G06F 3/044 345/174 |
| 2014/0292699 A1 | 10/2014 | Ando |
| 2014/0292711 A1* | 10/2014 | Teranishi ............. G09G 3/3696 345/174 |
| 2015/0193055 A1* | 7/2015 | Ando ...................... G06F 3/044 345/174 |
| 2015/0309625 A1* | 10/2015 | Huang .................. G06F 3/0418 345/174 |
| 2015/0378493 A1 | 12/2015 | Kano et al. |
| 2016/0195994 A1* | 7/2016 | Kitada ................... G06F 3/044 345/174 |
| 2016/0231849 A1 | 8/2016 | Watazu et al. |
| 2016/0357331 A1 | 12/2016 | Kano et al. |

FOREIGN PATENT DOCUMENTS

| | | |
|---|---|---|
| JP | 2011-48666 A | 3/2011 |
| JP | 2014-32481 A | 2/2014 |
| WO | WO 2013/089048 A1 | 6/2013 |
| WO | WO 2014/045847 A1 | 3/2014 |
| WO | WO 2014/208225 A1 | 12/2014 |
| WO | WO 2015/050097 A1 | 4/2015 |
| WO | WO 2015/156196 A1 | 10/2015 |

OTHER PUBLICATIONS

Written Opinion of the International Searching Authority issued in International Application No. PCT/JP2015/077657, dated Dec. 22, 2015.

* cited by examiner

THICKNESS
DIRECTION

FIRST
DIRECTION

TOUCH INPUT DEVICE AND TOUCH INPUT DETECTING METHOD

CROSS REFERENCE TO RELATED APPLICATIONS

The present application is a continuation of International application No. PCT/JP2015/077657, filed on Sep. 30, 2015, which claims priority to Japanese Patent Application No. 2014-206242, filed on Oct. 7, 2014, the entire contents of each of which are incorporated herein by reference.

TECHNICAL FIELD

The present invention relates to a touch input device and a touch input detecting method which detect a touch position and a pressing amount with respect to an operation surface.

BACKGROUND OF THE INVENTION

International Publication No. 2014/045847 discloses a touch panel which can detect a touch position on a screen and a pressing amount with respect to the screen. The touch panel disclosed in the foregoing document includes a dielectric film, a piezoelectric body film, and electrodes which sandwich each film. One principal surface of the dielectric film is an operation surface and when a user approaches and/or touches this operation surface, the electrodes sandwiching the dielectric film detect a change in a capacitance and detect a touch position based on a change in this capacitance. Furthermore, when the operation surface is pressed, electrodes sandwiching the piezoelectric body film detect a piezoelectric voltage thereby indicative of a pressing amount.

In order to detect a touch position, a capacitive touch panel needs to apply detection signals to electrodes, measure a response of the electrodes, stop applying the detection signals until next measurement is started, and discharge charges accumulated in the electrodes. When both a piezoelectric voltage and a pressing amount are detected while the charges are being discharged, the piezoelectric voltage sometimes changes and it is not possible to precisely detect the pressing amount.

It is therefore an object of the present invention to provide a touch input device and a touch input detecting method which can detect a pressing amount without being influenced by touch position detection processing.

BRIEF DESCRIPTION OF THE INVENTION

A touch input device according to the present invention includes: a position detecting sensor which detects a touch position on an operation surface; a press detecting sensor which detects a press on the operation surface; a position detecting sensor driving unit which alternatively outputs and stops outputting a drive signal to the position detecting sensor, detects a response signal outputted from the position detecting sensor, and discharges a charge of the position detecting sensor while the drive signal is no longer applied; and a press signal detecting unit which detects a press detection signal output from the press detecting sensor, and the press signal detecting unit detects the press detection signal during an output period in which the position detecting sensor driving unit outputs the drive signal.

According to this configuration, the press signal detecting unit detects the press signal during an output period of the drive signal by hedging a timing to discharge charges accumulated in the position detecting sensor. Consequently, it is possible to prevent a change in a piezoelectric voltage caused by discharging charges accumulated in the position detecting sensor from influencing the press signal detected by the press signal detecting unit. As a result, it is possible to precisely detect a pressing amount.

Preferably, the press signal detecting unit detects the press signal based on a timing at which the position detecting sensor driving unit starts outputting the drive signal.

According to this configuration, it is possible to prevent noise caused by touch position detection processing from influencing a press signal detected by a press signal detecting unit, and, consequently, precisely detect a pressing amount.

Preferably, the position detecting sensor includes a dielectric substrate, a first position detection electrode which is disposed on a first principal surface of the dielectric substrate, and a second position detection electrode which is disposed on a second principal surface of the dielectric substrate, and the press detecting sensor includes a piezoelectric film whose first principal surface overlaps the second principal surface of the dielectric substrate, a first piezoelectric detection electrode which is disposed on the first principal surface of the piezoelectric film, and a second piezoelectric detection electrode which is disposed on a second principal surface of the piezoelectric film.

It is possible to prevent noise caused by touch position detection processing from influencing and, consequently, it is possible to form the second position detection electrode and the first piezoelectric detection electrode in the same layer, i.e., for example, improve the degree of design freedom as in the above configuration. As a result, it is possible to make the touch input device thin.

Preferably, the second position detection electrode and the first piezoelectric detection electrode are formed in a same layer.

According to this configuration, the second position detection electrode and the first piezoelectric detection electrode are formed on the same plane, so that it is possible to make the touch input device thin in a laminating direction.

According to the present invention, it is possible to prevent noise caused by touch position detection processing from influencing a press signal detected by a press signal detecting unit, and, consequently, precisely detect a pressing amount.

DETAILED DESCRIPTION OF A PREFERRED EMBODIMENT

Figure 1:
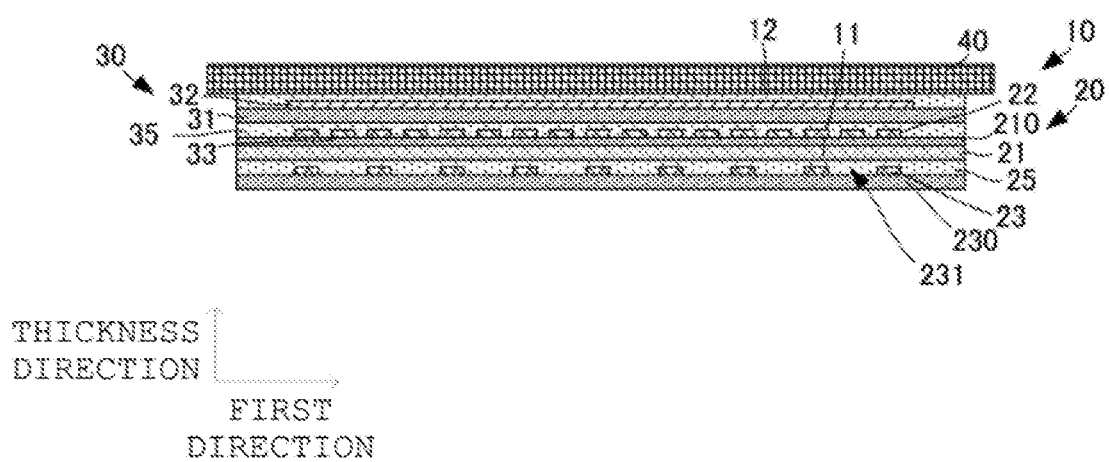
FIG. 1 is a side sectional view of a touch sensor according to an embodiment of the present invention.
Figure 2A:
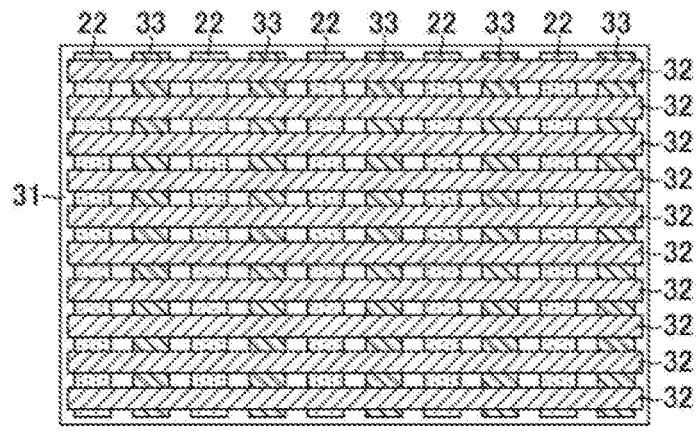
FIGS. 2(A) and 2(B) are plan views illustrating electrode patterns on various layers of the touch sensor according to the present embodiment.
Figure 2B:
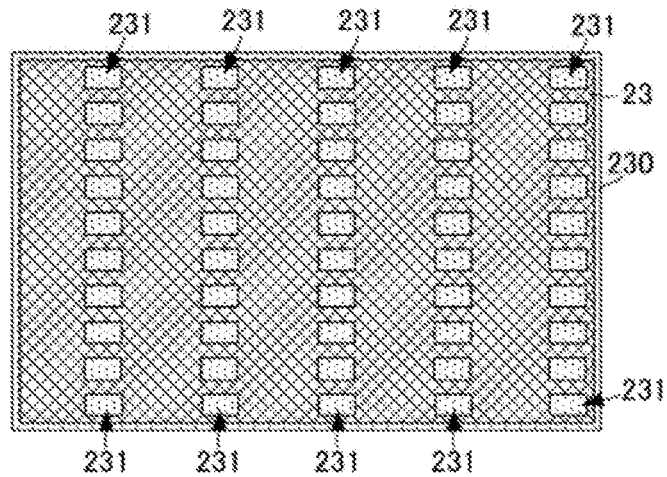
Figure 3:
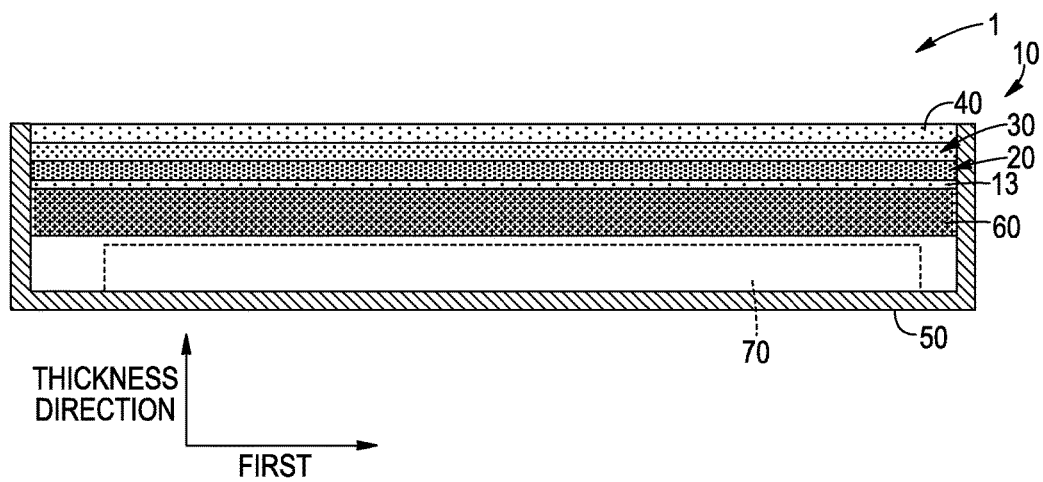
FIG. 3 is a side sectional view schematically illustrating a configuration of the touch input device which includes the touch sensor according to the present embodiment.

Referring now to the drawings wherever like numerals indicate like elements, FIGS. 1-3 illustrate a touch sensor 10 includes a press detecting sensor 20 and a position detecting sensor 30. The press detecting sensor 20 and the position detecting sensor 30 have rectangular flat shapes when seen from a plan view. The press detecting sensor 20 and the position detecting sensor 30 are overlaid and disposed such that their principal surfaces are parallel. The touch sensor 10 is preferably attached to a back surface side of a cover member 40 such that the position detecting sensor 30 is disposed at the side of the cover member 40. The cover member 40 is made of a glass plate or an acrylic plate having light-transmissiveness and an insulation property.

The cover member 40 has a surface which is preferably both an operation surface and a display surface to display images. The cover member 40 and the position detecting sensor 30 are preferably adhered by a light-transmissive pressure-sensitive adhesive 12. Similarly, the position detecting sensor 30 and the press detecting sensor 20 are preferably adhered by a light-transmissive pressure-sensitive adhesive 11. The pressure-sensitive adhesives 11 and 12 are, for example, acrylic pressure-sensitive adhesives.

As best illustrated in FIG. 3, the touch sensor 10 is mounted as part of a touch input device 1. The touch input device 1 includes a housing 50 which has substantially cuboid shape. The housing 50 has an opening. In the housing 50, the cover member 40, the touch sensor 10 (a laminated body of the press detecting sensor 20 and the position detecting sensor 30), a display panel 60 and an arithmetic operation circuit module 70 are disposed in that order from a side of the opening. The touch sensor 10 and the display panel 60 are preferably joined by a pressure sensitive adhesive 13. The modulus of the pressure-sensitive adhesive 13 is preferably selected so that it does not inhibit deformation of the press detecting sensor when a pressure is applied to the press detecting sensor. In lieu of the adhesive 13, a space may be provided between the touch sensor 10 and the display panel 60. In this case, the deformation of the press detecting sensor 20 is not inhibited. The display panel 60 is preferably a thin display such as a liquid crystal panel or an organic EL panel. The arithmetic operation calculation circuit module 70 may be a programmed processor which calculates an operation position and a pressing amount based on detection signals output from the press detecting sensor 20 and the position detecting sensor 30, respectively.

Next, a more specific configuration of one possible embodiment of the touch sensor 10 will be described with reference to FIG. 1. The press detecting sensor 20 includes a film member, preferably a piezoelectric film 21, and first and second piezoelectric detection electrodes 22 and 23 located on opposite main surfaces of the piezoelectric film 21.

The piezoelectric film 21 is preferably a film which has a rectangular shape and is made of chiral polymer. In the presently preferred embodiment, polylactic acid (PLA) and, more particularly, poly-L-lactic acid (PLLA) are used for chiral polymer. PLLA is uniaxially stretched. A uniaxial stretching direction forms approximately 45° in two orthogonal sides (a first direction side and a second direction side) which form the rectangular shape. The approximately 45° includes 45°±10°.

In this case, it is possible to obtain characteristics substantially equivalent to that obtained at 45°. Further, the approximately 45° may exceed a range of ±10° depending on a use mode. In this regard, the angle formed by the uniaxial stretching direction needs to be optionally adjusted and is the most preferably 45° when the touch sensor 10 is fixed only at both ends of the housing 50 in the first direction, only at both ends of the housing 50 in the second direction or along an outer circumference.

A main chain of PLLA made of chiral polymer adopts a helical structure. PLLA has piezoelectricity when PLLA is uniaxially stretched and molecules are oriented. Further, the uniaxially stretched PLLA produces charges when the flat film surface of the piezoelectric film is pressed. In this regard, the charge amount to be produced depends on a displacement amount that a flat surface is displaced in a direction orthogonal to the flat surface based on a pressing amount (pushing amount). Further, a piezoelectric constant of the uniaxially stretched PLLA is very high among polymers. Consequently, by using PLLA for the piezoelectric film 21, it is possible to detect displacement caused by a press with a high sensitivity.

In addition, a stretching ratio is preferably about three to eight times. Performing heat processing after stretching encourages crystallization of extended chain crystal of polylactic acid, so that the piezoelectric constant increases. In addition, when the piezoelectric film is biaxially stretched, it is possible to provide the same effect as that of uniaxial stretching by varying stretching ratios of respective axes. When, for example, the piezoelectric film is stretched eight times in a first axis direction and is stretched two times in a second axis direction orthogonal to the first axis direction, it is possible to obtain for the piezoelectric constant a substantially equivalent effect as that of a case where the piezoelectric film is uniaxially stretched four times in the first axis direction. That is, the above uniaxial stretching direction means a direction in which the piezoelectric film is stretched the most while also meaning a case where the piezoelectric film is stretched in a plurality of directions. Further, a simply uniaxially stretched film is easily broken in a stretching axis direction, so that it is possible to increase the strength to some degree by biaxially stretching the piezoelectric film as described above.

Furthermore, PLLA produces piezoelectricity during processing of orienting molecules by way of stretching or the like, and does not need to be subjected to poling processing unlike other polymers such as PVDF or a piezoelectric ceramics. That is, the piezoelectricity of PLLA which does not belong to a ferroelectric is not exhibited by ion polarization unlike ferroelectrics such as PVDF or PZT, and derives from a helical structure which is a characteristic structure of molecules. Therefore, PLLA does not produce pyroelectricity produced in piezoelectric bodies of other ferroelectrics, and is not influenced by a change in an ambient temperature. Hence, a vibration strength does not change due to a change in an atmospheric temperature, heat generated by an electronic device or a temperature change caused by a touch of a finger. Further, the piezoelectric constant of PVDF and the like temporally fluctuates and remarkably lowers depending on cases. However, the piezoelectric constant of PLLA is temporally very stable. Consequently, it is possible to detect displacement caused by a press with a high sensitivity without being influenced by surrounding environment.

Further, PLLA has high light-transmissiveness as an organic piezoelectric material. Consequently, it is possible to increase light-transmissiveness of the piezoelectric film 21.

The first piezoelectric detection electrode 22 is disposed on a first principal surface of the piezoelectric film 21. The first principal surface of the piezoelectric film 21 is a surface at a side of the position detecting sensor 30 and overlaps (and faces) a second principal surface of the position detecting sensor 30. A thin and highly light-transmissive hard coat layer 210 is preferably formed on the first principal surface of the piezoelectric film 21, and each first piezoelectric detection electrode 22 is formed on a surface of the hard coat layer 210. The hard coat layer 210 is preferably made of a material having an insulation property and having higher rigidity than that of the piezoelectric film 21.

For each first piezoelectric detection electrode 22, any one of inorganic electrodes such as ITO, ZnO, silver nanowires, carbon nanotubes or graphene and organic electrodes whose main components are polythiophene or polyaniline may, by way of example, be used. By using these materials, it is possible to form electrodes having high light-transmissiveness.

Further, according to this configuration, the hard coat layer 210 is formed on the first principal surface of the piezoelectric film 21. Consequently, when each first piezoelectric detection electrode 22 formed on the surface of the hard coat layer 210 is connected to an external circuit, each first piezoelectric detection electrode 22 can be connected by way of thermal pressure bonding by using an anisotropic conductive film.

The second piezoelectric detection electrode 23 is disposed at a side of a second principal surface of the piezoelectric film 21. The second principal surface of the piezoelectric film 21 is a surface opposite to the first principal surface of the piezoelectric film 21. The second piezoelectric detection electrode 23 is preferably formed on an insulation base film 230 which is preferably made of a material having light-transmissiveness. The insulation base film 230 is preferably adhered to the second principal surface of the piezoelectric film 21 by a pressure-sensitive adhesive 25 such that a surface on which each second piezoelectric detection electrode 23 is formed is at a side of the piezoelectric film 21.

As best shown in FIG. 2(B), the second piezoelectric detection electrode 23 is formed over almost the entire second principal surface of the piezoelectric film 21, with the exception of the non-electrode formation portions 231. The non-electrode formation portions 231 are provided in areas (position detection electrodes overlapping areas) corresponding to those areas where electrodes 32 and 33 of the position detecting sensor 30 overlap when the touch sensor 10 is viewed from above as viewed in FIG. 2(A). According to this configuration, the second piezoelectric detection electrode 23 adopts a structure which overlaps each first piezoelectric detection electrode 22 in areas other than the position detection electrode overlapping areas.

By forming the non-electrode formation portions 231, it is possible to make the degree of overlap of each electrode as uniform as possible. As a result, it is possible to reduce unevenness in color of the display panel 60.

The second piezoelectric detection electrode 23 may be formed using, by way of example, any one of inorganic electrodes such as ITO, ZnO, silver nanowires, carbon nanotubes or graphene and organic electrodes whose main components are polythiophene or polyaniline. By using these materials, it is possible to form electrodes having high light-transmissiveness.

According to this configuration, when the cover member 40 is pressed (pushed), and a stress is applied to the piezoelectric film 21, the piezoelectric film 21 deforms and produces charges. Each first piezoelectric detection electrode 22 and each second piezoelectric detection electrode 23 detect these charges and generate press detection signals, so that it is possible to detect a pressing amount.

The position detecting sensor 30 preferably includes a dielectric substrate 31 and first and second position detection electrodes 32 and 33 located on opposite principal surfaces of dielectric substrate 31. The dielectric substrate 31 preferably has a rectangular shape and is made of an insulation material having light-transmissiveness. The length direction of the dielectric substrate 31 (the horizontal direction as viewed in FIG. 2(A)) will be referred to as the first direction of the dielectric substrates. The width direction (the vertical direction as viewed in FIG. 2(A)) will be referred to as the second direction of the dielectric substrate 31.

Each first position detection electrode 32 is elongated and extends in the first direction of the dielectric substrate 31 such that the first direction of the dielectric substrate 31 and the longitudinal direction of the position detection electrodes 32 are parallel. The first principal surface of the dielectric substrate 31 is a surface of the dielectric substrate 31 at the side of the cover member 40.

The first position detection electrodes 32 are spaced one another at intervals along the second direction of the dielectric substrate 31. Each first position detection electrode 32 is preferably directly formed on the first principal surface of the dielectric substrate 31.

Each second position detection electrode 33 has an elongated shape and is disposed on the second principal surface of the dielectric substrate 31 such that the second direction of the dielectric substrate 31 and the longitudinal direction of the second position detection electrodes 33 are parallel. The second principal surface of the dielectric substrate 31 is a surface of the dielectric substrate 31 at the side of the press detecting sensor 20. The second position detection electrodes 33 are spaced from one another at intervals along the first direction of the dielectric substrate 31. The second principal surface of the dielectric substrate 31 and the first principal surface of the piezoelectric film 21 overlap and are preferably coextensive. Hence, each second position detection electrode 33 is formed on the surface of the hard coat layer 210, and is formed in the same layer as each first piezoelectric detection electrode 22 (see FIG. 1). As best shown in FIG. 2(A) the electrodes 22 and 33 alternate along the first direction (the horizontal direction of FIG. 2(A)). By forming the electrodes 22 and 33 in the same layer, it is possible to make the touch sensor 10 thin.

The first position detection electrodes 32 and the second position detection electrodes 33 are preferably made of a material having light-transmissiveness, for example ITO. Consequently, the position detecting sensor 30 has the light-transmissiveness.

According to such a configuration, a change in a capacitance caused when a finger contacts or approaches the operation surface changes a capacitance between each first position detection electrode 32 and each second position detection electrode 33. In this regard, the capacitance in an area in which the first position detection electrode 32 and the second position detection electrode 33 are located at the closest position to the face of the user's finger changes the most. Consequently, by detecting a combination of the first position detection electrode 32 and the second position detection electrode 33 whose change in the capacitance is the greatest, it is possible to detect an operation position.

Figure 4:
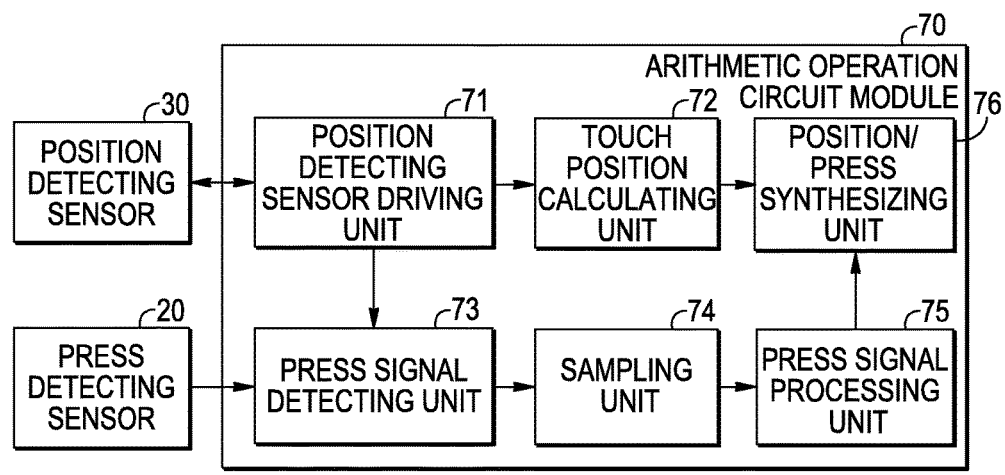
FIG. 4 is a block diagram illustrating a configuration of an arithmetic operation circuit module.

FIG. 4 is a block diagram illustrating, inter alia, a configuration of the arithmetic operation circuit module 70.

A position detecting sensor driving unit 71 alternately outputs and stops outputting/applying drive signals to the position detecting sensor 30. More specifically, the position detecting sensor driving unit 71 cyclically applies drive voltages between each first position detection electrode 32 and each second position detection electrode 33. When a user's finger approaches (or touches) the operation surface while the drive voltage is applied between the electrodes 32 and 33, a change in the capacitance between the electrodes 32 and 33 produces a change in the current. The position detecting sensor 30 outputs this current as a position detection signal. The position detecting sensor driving unit 71 detects this position detection signal (a response signal).

When the position detecting sensor driving unit 71 stops outputting the drive signals, it connects one or both of the electrodes 32 and 33 to a ground before outputting the next drive signal. As a result, charges accumulated between the electrodes 32 and 33 are discharged. Hence, when the next drive signal is outputted and the operation surface is touched, the capacitance changes between the electrodes 32 and 33 will change.

A touch position calculating unit 72 calculates a touch position on the operation surface based on the position detection signal detected by the position detecting sensor driving unit 71. More specifically, the touch position calculating unit 72 detects that combination of first and second position detection electrodes 32 and 33 whose capacitance changes the most and specifies a position corresponding to this combination.

A press signal detecting unit 73 detects a press detection signal outputted from the press detecting sensor 20. When the user presses the operation surface and a stress is applied to the piezoelectric film 21, the piezoelectric film 21 deforms and produces charges. The press detecting sensor 20 detects the produced charges based on each first piezoelectric detection electrode 22 and the second piezoelectric detection electrode 23, and outputs a press detection signal (preferably a voltage value) as a function thereof.

The press signal detecting unit 73 detects the press detection signal during a period in which the position detecting sensor driving unit 71 outputs the drive signal to the position detection sensor 30. More particularly, and as described in further detail below, the press signal detecting unit 73 detects the press detection signal when notified by the position detecting sensor driving unit 71 that the detection of the position detection signal has ended.

A sampling unit 74 samples the press detection signal detected by the press signal detecting unit 73 at a predetermined cycle.

A press signal processing unit 75 calculates a pressing amount applied to the press detecting sensor 20, e.g., the amount of force applied to the operation surface by the user's finger, based on a voltage value associated with data sampled by the sampling unit 74.

A position/press synthesizing unit 76 synthesizes a touch position calculated by the touch position calculating unit 72 and a pressing amount calculated by the press signal processing unit 75. Data synthesized by the position/press synthesizing unit 76 is output to, for example, a control unit (not illustrated), and this control unit optionally executes processing as a function of the calculated touch position and pressing amount.

Figure 5:
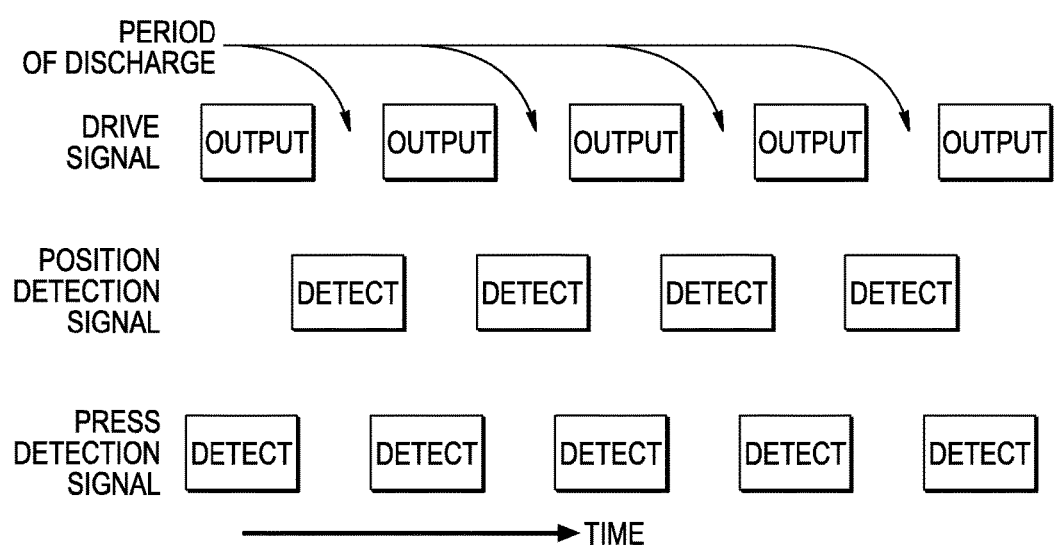
FIG. 5 is a view for explaining the relative timing at which the position detecting sensor driving unit and the press signal detecting unit detect signals.

FIG. 5 is a view for explaining the various timings at which the position detecting sensor driving unit 71 and the press signal detecting unit 73 detect signals. The press signal detecting unit 73 detects the press detection signal generated by press detection sensor 20 during a period in which the position detecting sensor driving unit 71 outputs the drive signal (i.e., during a period in which the drive signal is applied to the position detecting sensor 30). More specifically, as illustrated in FIG. 5, the position detecting sensor driving unit 71 outputs the drive signal, and then detects the position detection signal after it stops outputting the drive signal. The press signal detecting unit 73 detects the press detection signal while the drive signal is generated but after the position detecting sensor driving unit 71 detects the position detection signal.

As described above, the first piezoelectric detection electrodes 22 of the press detecting sensor 20 and the second position detection electrodes 33 of the position detecting sensor 30 are preferably provided in the same layer. Further, after the position detecting sensor driving unit 71 stops outputting the drive signals, the electrodes 22 and 23 of the press detecting sensor 20 are connected to the ground and charges accumulated between the electrodes 22 and 23 are discharged. When the electrodes 22 and 23 are connected to the ground, the voltage of the press detection signal (generated by the press detecting sensor 20) lowers. If the press detection signal is detected and the pressing amount is calculated while the voltage lowers in this way, a press may be erroneously detected due to the change in the voltage even though there is no pressing operation.

Hence, as illustrated in FIG. 5, the press signal detecting unit 73 detects the press detection signal during the period in which the position detecting sensor driving unit 71 outputs the drive signal. By not calculating the pressing amount while the voltage lowers, it is possible to avoid a problem that a press is erroneously detected. The present embodiment is particularly useful for a configuration where the second position detection electrodes 33 and the first press detection electrodes 22 are disposed in the same layer.

Further, according to the present embodiment, the press signal detecting unit 73 detects a press detection signal after a position detection signal has been detected, so that it is possible to calculate a pressing amount while a touch position is not being calculated, and thereby smooth a load of software processing.

As described above, according to the present embodiment, by detecting a press detection signal when an output voltage of a press detection signal from the press detecting sensor 20 is not being lowered, it is possible to precisely calculate a pressing amount with respect to the operation surface.

In this regard, the press signal detecting unit 73 may detect a press detection signal at any time during the period in which the position detecting sensor driving unit 71 outputs a drive signal. For example, the position detecting sensor driving unit 71 may detect a press detection signal after a predetermined period of time passes since a position detection signal is detected. In this case, it is possible to detect a change in a piezoelectric voltage after a response time, and stably detect a press detection signal. Further, the press signal detecting unit 73 may detect a press detection signal at a timing at which the position detecting sensor driving unit 71 starts outputting a drive signal. In this case, processing for waiting for a predetermined time is omitted, so that it is possible to simplify entire control.

Further, according to the present embodiment, the second position detection electrodes 33 and the first press detection electrodes 22 are formed in the same layer. However, the touch sensor 10 may employ a configuration where the second position detection electrodes 33 and the first press detection electrodes 22 are disposed closely. Further, various piezoelectric materials such as PVDF and piezoelectric ceramics can be used for the piezoelectric film 21.

DESCRIPTION OF REFERENCE SYMBOLS

1: TOUCH INPUT DEVICE
10: TOUCH SENSOR
11, 12: PRESSURE-SENSITIVE ADHESIVE

20: PRESS DETECTING SENSOR
21: PIEZOELECTRIC FILM
22: FIRST PIEZOELECTRIC DETECTION ELECTRODE
23: SECOND PIEZOELECTRIC DETECTION ELECTRODE
25: PRESSURE-SENSITIVE ADHESIVE
30: POSITION DETECTING SENSOR
31: DIELECTRIC SUBSTRATE
32: FIRST POSITION DETECTION ELECTRODE
33: SECOND POSITION DETECTION ELECTRODE
40: COVER MEMBER
50: HOUSING
60: DISPLAY PANEL
70: ARITHMETIC OPERATION CIRCUIT MODULE
71: POSITION DETECTING SENSOR DRIVING UNIT
72: TOUCH POSITION CALCULATING UNIT
73: PRESS SIGNAL DETECTING UNIT
74: SAMPLING UNIT
75: PRESS SIGNAL PROCESSING UNIT
76: PRESS SYNTHESIZING UNIT
210: HARD COAT LAYER
230: INSULATION BASE FILM
231: NON-ELECTRODE FORMATION PORTION

The invention claimed is:

1. A touch input device comprising:
a position detecting sensor which detects a touch position on an operation surface when a drive signal is applied thereto;
a press detecting sensor which detects a press operation on the operation surface;
a drive signal generator which alternatively applies and stops applying the drive signal to the position detecting sensor, detects a response signal outputted from the position detecting sensor, and discharges a charge of the position detecting sensor during a period in which the drive signal is not applied to the position detecting sensor; and
a press signal detector which detects a press signal output from the press detecting sensor, the press signal detector detecting the press signal during a period in which the drive signal generator applies the drive signal to the position detecting sensor and not during a period in which the charge of the position detecting sensor is discharged, the press detection signal being detected during a period in which the position detecting driving unit is not detecting the position detection signal.

2. The touch input device according to claim 1, wherein the press signal detector detects the press signal based on a timing at which the drive signal generator starts applying the drive signal to the position detecting sensor.

3. The touch input device according to claim 1, wherein: the position detecting sensor includes:
a dielectric substrate,
one or more first position detection electrodes disposed on a first principal surface of the dielectric substrate, and
one or more second position detection electrodes disposed on a second principal surface of the dielectric substrate, and
the press detecting sensor includes:
a piezoelectric film whose first principal surface is disposed overlapping the second principal surface of the dielectric substrate,
one or more first piezoelectric detection electrodes disposed on the first principal surface of the piezoelectric film, and
one or more second piezoelectric detection electrodes disposed on a second principal surface of the piezoelectric film.

4. The touch input device according to claim 3, wherein the one or more second position detection electrodes and the one or more first piezoelectric detection electrodes are formed in a same layer.

5. A touch input device according to claim 3, wherein:
the one or more first position electrodes and the one or more second position detection electrodes form a grid wherein a respective first position electrode overlaps a respective second position electrode at each of a plurality of overlapping areas; and
the one or more second piezoelectric detection electrodes is a single detection electrode having openings which align with each of the overlapping areas.

6. A touch input device according to claim 5, wherein the one or more second position detection electrodes and the one or more first piezoelectric detection electrode all extend parallel to one another in the same layer with respective second position detection electrodes alternating with respective first piezoelectric detection electrodes.

7. A touch input detecting method comprising:
using a position detecting sensor to detect a touch position on an operation surface when a drive signal is applied thereto;
using a press detecting sensor to detect a press operation on the operation surface;
alternatively applying and stop applying the drive signal to the position detecting sensor;
detecting a response signal output by the position detecting sensor and discharging a charge of the position detecting sensor during a period in which the drive signal is not applied to the position detecting sensor; and
detecting a press signal output from the press detecting sensor during a period in which the drive signal is applied to the position detecting sensor and not during a period in which the charge of the position detecting sensor is discharged, the press detection signal being detected during a period in which the position detecting driving unit is not detecting the position detection signal.

8. The touch input detecting method according to claim 7, wherein the press signal is detected based on a liming at which the drive signal is applied to the position detecting sensor.

9. The touch input detecting method according to claim 7, wherein:
the position detecting sensor includes:
a dielectric substrate,
one or more first position detection electrodes disposed on a first principal surface of the dielectric substrate, and
one or more second position detection electrodes disposed on a second principal surface of the dielectric substrate, and
the press detecting sensor includes:
a piezoelectric film whose first principal surface is disposed overlapping the second principal surface of the dielectric substrate,
one or more first piezoelectric detection electrodes disposed on the first principal surface of the piezoelectric film, and
one or more second piezoelectric detection electrodes disposed on a second principal surface of the piezoelectric film.

10. The touch input detecting method according to claim 7, wherein the one or more second position detection electrodes and the one or more first piezoelectric detection electrodes are formed in a same layer.

11. The touch input detecting method according to claim 7, wherein the one or more first position electrodes and the one or more second position detection electrodes form a grid wherein a respective first position electrode overlaps a respective second position electrode at each of a plurality of overlapping areas; and the one or more second piezoelectric detection electrodes is a single detection electrode having openings which align with each of the overlapping areas.

12. The touch input detecting method according to claim 11, wherein the one or more second position detection electrodes and the one or more first piezoelectric detection electrode all extend parallel to one another in the same layer with respective second position detection electrodes alternating with respective first piezoelectric detection electrodes.

\* \* \* \* \*